US012584933B2

(12) United States Patent
Ota et al.

(10) Patent No.: US 12,584,933 B2
(45) Date of Patent: Mar. 24, 2026

(54) AUTOMATIC ANALYZER AND CONTROL PROGRAM FOR AUTOMATIC ANALYZER

(71) Applicant: HITACHI HIGH-TECH CORPORATION, Tokyo (JP)

(72) Inventors: Yuichiro Ota, Tokyo (JP); Kenta Imai, Tokyo (JP); Shunsuke Sasaki, Tokyo (JP); Hidekazu Tezuka, Tokyo (JP); Hiroya Umeki, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 924 days.

(21) Appl. No.: 17/781,851

(22) PCT Filed: Oct. 27, 2020

(86) PCT No.: PCT/JP2020/040176
§ 371 (c)(1),
(2) Date: Jun. 2, 2022

(87) PCT Pub. No.: WO2021/131296
PCT Pub. Date: Jul. 1, 2021

(65) Prior Publication Data
US 2023/0010798 A1     Jan. 12, 2023

(30) Foreign Application Priority Data
Dec. 26, 2019     (JP) ................................. 2019-236532

(51) Int. Cl.
G01N 35/00          (2006.01)
G01N 35/10          (2006.01)
(52) U.S. Cl.
CPC . G01N 35/00594 (2013.01); G01N 35/00722 (2013.01); G01N 35/0092 (2013.01);
(Continued)

(58) Field of Classification Search
CPC ......... G01N 35/0092; G01N 35/00594; G01N 35/1011; G01N 35/00722;
(Continued)

(56) References Cited

U.S. PATENT DOCUMENTS

2011/0223580 A1     9/2011   Kuwano et al.
2011/0293477 A1*   12/2011   Yamazawa ....... G01N 35/00623
                                                       422/67
(Continued)

FOREIGN PATENT DOCUMENTS

CN          110418966 A      11/2019
JP         2010025587 A       2/2010
(Continued)

OTHER PUBLICATIONS

International Search Report of PCT/JP2020/040176 dated Jan. 19, 2021.
(Continued)

*Primary Examiner* — Shogo Sasaki
(74) *Attorney, Agent, or Firm* — MATTINGLY & MALUR, PC

(57)          ABSTRACT
The invention has an object to provide an automatic analyzer and a control program that can shorten total analysis time. The automatic analyzer comprises: a sample rack that houses a sample; a sample dispensing mechanism that aspirates the sample from the sample rack and dispenses the sample into a reaction container; a plurality of detection units that detect a reaction liquid in the reaction container; and a control unit that controls the sample dispensing mechanism and the detection units. The control unit checks the measurement item specified for the sample and checks one of the detection units that is specified by the measurement item. When measurements specifying the same detection unit among the detection units are specified consecu-
(Continued)

tively, the order of dispensing by the sample dispensing mechanism is changed so that measurements specifying different detection units are made consecutively.

10 Claims, 11 Drawing Sheets

(52) U.S. Cl.
CPC ................... *G01N 35/1011* (2013.01); *G01N 2035/00891* (2013.01); *G01N 2035/0096* (2013.01); *G01N 2035/1013* (2013.01)

(58) Field of Classification Search
CPC ... G01N 2035/0096; G01N 2035/0094; G01N 2035/00891; G01N 2035/1086; G01N 2035/0441; G01N 2035/1013
See application file for complete search history.

(56) References Cited

U.S. PATENT DOCUMENTS

| | | | |
|---|---|---|---|
| 2013/0294974 A1 | 11/2013 | Shiba et al. | |
| 2014/0348704 A1* | 11/2014 | Kobayashi | ......... G01N 35/0092 |
| | | | 422/67 |
| 2015/0293135 A1* | 10/2015 | Yamashita | ......... G01N 35/0098 |
| | | | 422/68.1 |
| 2019/0351419 A1 | 11/2019 | Fujita et al. | |
| 2019/0383842 A1 | 12/2019 | Saito | |
| 2020/0072860 A1* | 3/2020 | Oda | ................... G01N 35/0095 |
| 2020/0241029 A1* | 7/2020 | Imai | .................... G01N 33/493 |
| 2021/0123935 A1* | 4/2021 | Shibuya | ............. G01N 35/1002 |
| 2021/0318345 A1* | 10/2021 | Kaneda | ........... G01N 35/00712 |
| 2022/0011326 A1* | 1/2022 | Hagiwara | ......... G01N 35/0095 |
| 2023/0135106 A1* | 5/2023 | Fujita | ................. G01N 35/1016 |
| | | | 422/64 |

FOREIGN PATENT DOCUMENTS

| | | | |
|---|---|---|---|
| JP | 2011185821 A | 9/2011 | |
| JP | 2013068442 A | 4/2013 | |
| WO | 2012/077536 A1 | 6/2012 | |
| WO | 2014/110282 A1 | 7/2014 | |
| WO | 2018/155190 A1 | 8/2018 | |

OTHER PUBLICATIONS

Extended European Search Report received in corresponding European Application No. 20904288.6 dated Jan. 29, 2024.
Chinese Office Action received in corresponding Chinese Application No. 202080084786.3 dated Oct. 31, 2025.

* cited by examiner (a)

| MEASUREMENT No. | SAMPLE | MEASUREMENT ITEM |
|---|---|---|
| 1 | a | A(1) |
| 2 | a | B(1) |
| 3 | a | C(1) |
| 4 | b | D(2) |
| 5 | b | E(2) |
| 6 | b | F(2) |

(b)

☐  SAMPLE DISPENSING (c)

☐  DETECTION (a)

| MEASUREMENT No. | SAMPLE | MEASUREMENT ITEM |
|:---:|:---:|:---:|
| 1 | a | A(1) |
| 2 | a | B(1) |
| 3 | a | C(1) |
| 4 | b | D(2) |
| 5 | b | E(2) |
| 6 | b | F(2) |

(b)

☐ SAMPLE DISPENSING (c)

☐ DETECTION

IN ORDER TO SHORTEN MEASUREMENT TIME,
YOU ARE RECOMMENDED TO CHANGE DETECTION
UNIT FOR MEASUREMENT ITEM A TO DETECTION UNIT 1.

CLOSE

AUTOMATIC ANALYZER AND CONTROL PROGRAM FOR AUTOMATIC ANALYZER

TECHNICAL FIELD

The present invention relates to an automatic analyzer and a control program for the same.

BACKGROUND ART

An automatic analyzer usually includes a sample dispensing mechanism for dispensing a sample and a detection unit for causing the dispensed sample to react with a reagent in a reaction container to make an inspection. One analyzer includes a plurality of detection units so that an inspection is made by a detection unit relevant to an inspection item (for example, see Patent Literature 1). When a plurality of detection units are operated in parallel, the analysis time can be shortened.

In this type of automatic analyzer, a measurement item is specified for each supplied sample and one among a plurality of detection units may be specified for each measurement item. The automatic analyzer allocates the specified detection unit, and in this way, detections are made sequentially.

However, for a series of measurement items, there is a case that the same detection unit is specified consecutively. In this case, a situation continues in which only one detection unit among the plurality of detection units is used consecutively and the other units are not used and thus the detection units cannot be operated in parallel. As a consequence, the total analysis time may be lengthened.

CITATION LIST

Patent Literature

Patent Literature 1: Japanese Patent Application Laid-Open No. 2011-185821

SUMMARY OF INVENTION

Technical Problem

The present invention has an object to provide an automatic analyzer and a control program that can shorten total analysis time.

Solution to Problem

In order to achieve the above object, an automatic analyzer according to the present invention comprises: a sample rack that houses a sample; a sample dispensing mechanism that aspirates the sample from the sample rack and dispenses the sample into a reaction container; a plurality of detection units that detect a reaction liquid in the reaction container; and a control unit that controls the sample dispensing mechanism and the detection units. The control unit checks a measurement item specified for the sample and checks one of the detection units that is specified by the measurement item, and when measurements specifying the same detection unit among the detection units are specified consecutively, changes the order of dispensing by the sample dispensing mechanism so that measurements specifying different detection units are made consecutively.

Advantageous Effects of Invention

According to the present invention, even when a detection unit is specified for each item, the total analysis time can be shortened by changing the order of sample dispensing to enable detection units to make measurements alternately whenever possible.

DESCRIPTION OF EMBODIMENTS

Figure 1:
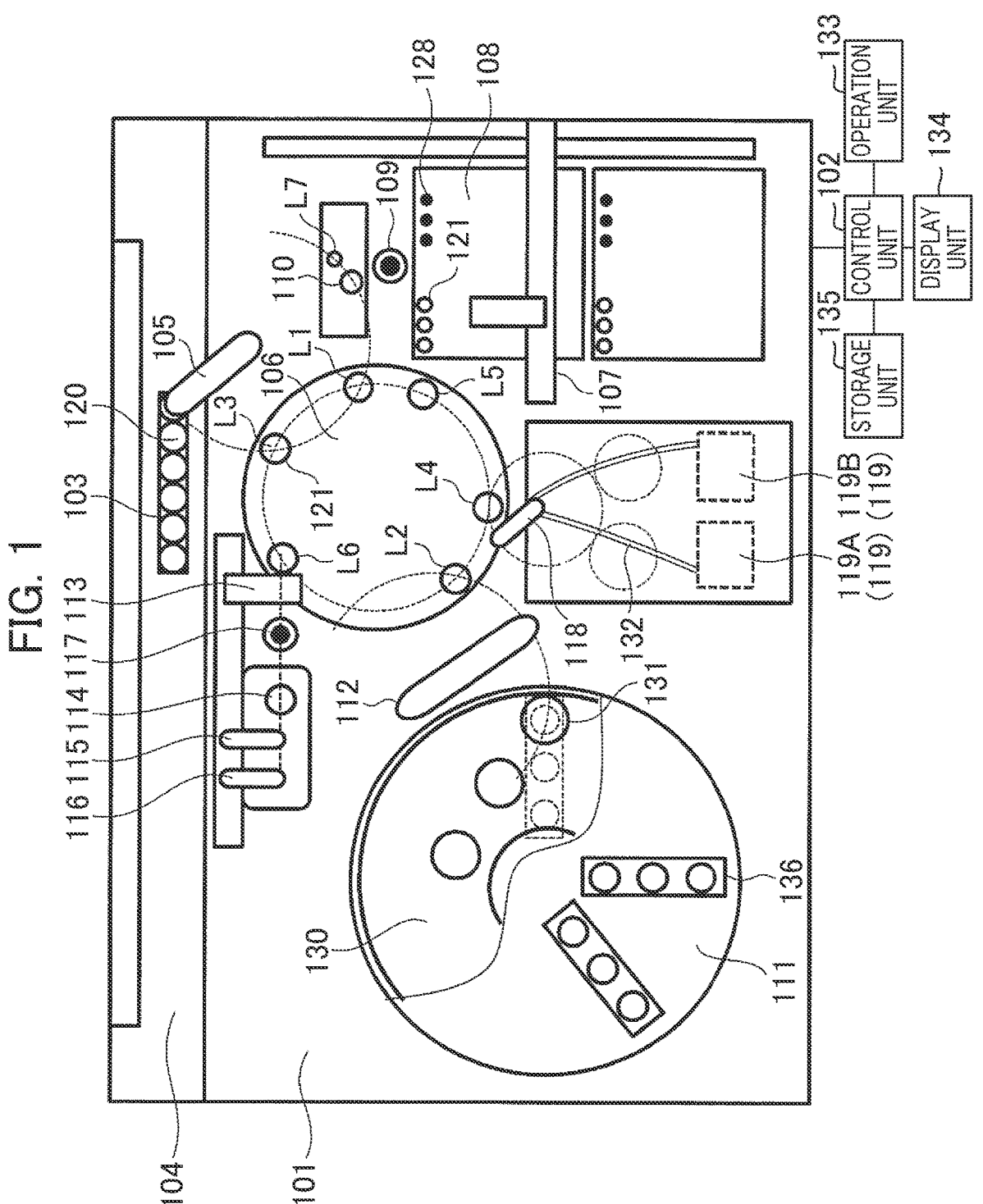
FIG. 1 is a schematic diagram that summarizes the analysis operation that is performed by an immuno-analyzer 101 according to the first embodiment.

Hereinafter the embodiments will be described in detail referring to the accompanying drawings. In the drawings, elements with the same functions may be designated by the same reference numerals or corresponding numbers. The accompanying drawings illustrate the embodiments and examples of implementation that accord with the principle of the present disclosure. However, they are intended for understanding of the present disclosure and should never be used to interpret the present disclosure in a limited way. The description in this specification is merely a typical example and does not limit the claims of the present disclosure or application examples in any sense.

Although description of the embodiments is sufficiently detailed for a person skilled in the art to embody the present disclosure, it should be understood that another implementation or form is possible and it is possible to change the configuration or structure and replace various elements without departing from the scope and spirit of the technical idea of the present disclosure. Therefore, the description given below should not be interpreted as limiting the present disclosure to these embodiments.

First Embodiment

FIG. 1 is a diagram of the general structure of an automatic analyzer according to the first embodiment. An explanation will be made below, taking it as an example a case that the automatic analyzer is an immuno-analyzer.

As shown in FIG. 1, the immuno-analyzer 101 includes a control unit 102, a sample rack 103, a rack conveyance line 104, a sample dispensing mechanism 105, an incubator (in which a container is set) 106, a reaction container conveyance mechanism 107, a reaction container holding unit 108, a reaction container stirring mechanism 109, and a discarding hole 110. In addition to these, the immuno-analyzer 101 includes a reagent disk 111, a reagent dispensing mechanism 112, a B/F separation conveyance mechanism 113, a B/F separation mechanism 114, a reaction liquid aspiration mechanism for B/F separation 115, a buffer solution discharge mechanism 116, a post-B/F-separation stirring mechanism 117, a reaction liquid aspiration mechanism for detection 118, and a plurality of detection units 119 (two units in this example (a first detection unit 119A and a second detection unit 119B).

The control unit 102 performs control of the entire immuno-analyzer 101 including the sample dispensing mechanism 105. Details of the control will be explained later. A sample container 120 holding a sample is set in the sample rack 103. One sample rack 103 can be structured to be able to hold a plurality of sample containers 120. The rack conveyance line 104 moves a sample container 120 set in the sample rack 103, to a sample dispensing position near the sample dispensing mechanism 105. The control unit 102 includes: an operation unit 133 to receive various operations from the operator; a display unit 134 to display an interface screen, measurement results and so on; and a storage unit 135 to store various data and a control program (program that controls sample dispensing and analysis, etc.).

The sample dispensing mechanism 105 has a nozzle capable of rotating and moving vertically, and after aspirating the sample held in the sample container 120, discharges the aspirated sample into a reaction container 121 on the incubator 106. The incubator 106 is structured to be able to hold a plurality of warmed reaction containers 121 and has a reaction disk that accelerates reaction of the reaction liquid housed in the reaction container 121. The reaction disk is structured to be able to rotate around a rotation axis. As the reaction disk rotates, the reaction container 121 can be moved to a reaction container set position L1, a reagent discharge position L2, a sample discharge position L3, a reaction liquid aspiration position L4 for detection, a reaction container discard position L5, and a B/F separation conveyance position L6.

The reaction container conveyance mechanism 107 is a three-axis conveyance mechanism that can move in three directions, namely X axis, Y axis, and Z axis directions, and grasps the sample dispensing tip 128 and reaction container 121 and conveys them to a specified position. The reaction container holding unit 108 is a holder that holds many unused reaction containers 121 and sample dispensing tips 128. The reaction container stirring mechanism 109 mixes the sample and reagent in the reaction container 121 by rotating the reaction container 121. The discarding hole 110 is a hole connected to a discard container (not shown) for discarding used reaction containers and sample dispensing tips 128. The reaction container conveyance mechanism 107 moves between the reaction container holding unit 108, reaction container stirring mechanism 109, discarding hole 110, attachment position L7 for the sample dispensing tip 128, and incubator 106, to convey the sample dispensing tip 128 and reaction container 121.

In the reagent disk 111, a plurality of reagent containers 136 holding a reagent are set. The inside of the reagent disk 111 is kept at a prescribed temperature and a cover 130 is provided over the reagent disk 111. A cover opening 131 is provided in part of the cover 130.

The reagent dispensing mechanism 112 has a nozzle capable of rotating and moving vertically and is structured to be able to aspirate the reagent held in a reagent container 136 in the reagent disk 111 and discharge the aspirated reagent into a reaction container 121 on the incubator 106. The B/F separation conveyance mechanism 113 moves the reaction container 121 that has stayed on the incubator 106 for a prescribed time, from the B/F separation conveyance position L6 to the B/F separation mechanism 114. The B/F separation mechanism 114 is a mechanism that separates the reaction liquid not containing magnetic particles from magnetic particles, by making the magnetic particles containing a substance immunologically bound to the object of measurement in the reaction liquid housed in the reaction container 121, adsorb to the inner wall of the reaction container 121 magnetically.

The reaction liquid aspiration mechanism 115 for B/F separation is structured to be able to move in the X axis and Z axis directions. The reaction liquid aspiration mechanism 115 for B/F separation moves to above the reaction container 121 that has stayed on the B/F separation mechanism 114 for a prescribed time, and moves down to aspirate the reaction liquid in the reaction container 121 that does not contain magnetic particles.

The buffer solution discharge mechanism 116 is structured to be able to move in the X axis and Z axis directions and, on the B/F separation mechanism 114, moves to above the reaction container 121 in which the reaction liquid not containing magnetic particles has been aspirated and moves down to discharge the buffer solution into the reaction container 121. The post-B/F-separation stirring mechanism 117 mixes the magnetic particles in the reaction container 121 and the buffer solution by rotating the reaction container 121. The reaction container 121 after mixing is conveyed to the B/F separation conveyance position L6 of the incubator 106 by the B/F separation conveyance mechanism 113.

The reaction liquid aspiration mechanism 118 for detection is structured to be able to rotate and move vertically and structured to be able to aspirate the reaction liquid housed in the reaction container 121 on the incubator 106 and send the liquid to the detection unit 119. As for the detection unit (analysis unit) 119, a plurality of detection units 119 (in this example, two units or a first detection unit 119A and a second detection unit 119B) are installed and they detect (analyze) the concentration, etc. of the object of detection in the reaction liquid aspirated and sent from the reaction liquid aspiration mechanism 118 for detection. The first detection unit 119A and second detection unit 119B are connected to the reaction liquid aspiration mechanism 118 for detection through a liquid sending flow path 132.

Next, analysis operation that is performed by the immuno-analyzer 101 according to the first embodiment will be outlined.

In analysis operation, first, the control unit 102 receives a measurement input signal from the operation unit 133 and outputs a control signal to each mechanism in the immuno-analyzer 101 in order to make analysis and controls the operation of the mechanism.

The reaction container conveyance mechanism 107 moves to above the reaction container holding unit 108, moves down, grasps an unused reaction container 121 and moves up. After that, the reaction container conveyance mechanism 107 moves to above the reaction container set position L1 of the incubator 106, moves down and sets the unused reaction container 121 on the incubator 106.

Then, the conveyance mechanism 107 moves to above the reaction container holding unit 108, moves down, grasps an unused sample dispensing tip 128 and moves up. After that, the conveyance mechanism 107 moves to above the tip attachment position L7, moves down and sets the unused sample dispensing tip 128 over the tip attachment position L7. After that, the nozzle of the sample dispensing mechanism 105 moves to above the tip attachment position L7, moves down and attaches the sample dispensing tip 128 to the tip of the dispensing nozzle of the sample dispensing mechanism 105.

Then, the nozzle of the reagent dispensing mechanism 112 rotates and moves to above the opening 131 of the reagent disk cover 130, moves down and makes the nozzle tip contact the reagent in a specified reagent container 136 to aspirate a prescribed amount of reagent. Then, the nozzle of the reagent dispensing mechanism 112 moves to above the reagent discharge position L2 of the incubator 106 and discharges the reagent into the reaction container 121 set on the incubator 106.

On the other hand, after the sample dispensing tip 128 is attached, the nozzle of the sample dispensing mechanism 105 moves to above the sample container 120 set in the sample rack 103 and moves down to aspirate a prescribed amount of sample which is held in the sample container 120. After that, the nozzle of the sample dispensing mechanism 105 moves to the sample discharge position L3 of the incubator 106 and moves down to discharge the sample into the reaction container 121 into which the reagent has been dispensed. After discharging the sample, the nozzle of the sample dispensing mechanism 105 performs mixing operation. After finishing the mixing operation, the nozzle of the sample dispensing mechanism 105 moves to above the discarding hole 110 and discards the used sample dispensing tip 128 into the discarding hole 110.

After that, the control unit 102 moves the reaction container 121 in which the sample and reagent have been mixed, to the reaction container set position L1, by rotating the incubator 106 and conveys the reaction container 121 to the reaction container stirring mechanism 109 by the conveyance mechanism 107.

The reaction container stirring mechanism 109 rotates the reaction container 121 and performs stirring to mix the sample and reagent in the reaction container 121. After that, the control unit 102 moves back the reaction container 121 in which stirring has been ended, to the reaction container set position L1 of the incubator 106 by the conveyance mechanism 107.

The control unit 102 performs the B/F separation process explained below selectively for a measurement item according to an analysis protocol. First, the reaction container 121 that has stayed on the incubator 106 for a prescribed time is moved to the B/F separation conveyance position L6 by rotation of the incubator 106 and the reaction container 121 is conveyed to the B/F separation mechanism 114 by the B/F separation conveyance mechanism 113.

Then, the B/F separation mechanism 114 makes the magnetic particles containing a substance immunologically bound to the object of measurement in the reaction liquid in the reaction container 121, adsorb to the inner wall of the reaction container 121 magnetically. After a prescribed time has elapsed, the nozzle of the reaction liquid aspiration mechanism 115 for B/F separation is moved to above the reaction container 121 and moved down to aspirate the reaction liquid not containing magnetic particles in the reaction container 121.

After that, the nozzle of the buffer solution discharge mechanism 116 is moved to above the reaction container 121 and moved down to discharge the buffer solution into the reaction container 121. Then, the B/F separation conveyance mechanism 113 conveys the reaction container 121 to the post-B/F-separation stirring mechanism 117.

After that, in the post-B/F-separation stirring mechanism 117, the reaction container 121 is rotated to mix the magnetic particles and buffer solution in the reaction container 121. The reaction container 121 in which mixing of the magnetic particles and buffer solution is ended is moved back to the B/F separation conveyance position L6 of the incubator 106 by the B/F separation conveyance mechanism 113. The above dispensing and reaction steps are carried out for each measurement item, for example, in cycles of 12 seconds.

Next, the detection process in which the detection unit 119 detects the object of measurement in the reaction liquid is explained in detail below. First, the reaction container 121 into which the sample and reagent are dispensed and which has stayed on the incubator 106 for the prescribed time or the reaction container 121 which has been subjected to B/F separation is moved to the reaction liquid aspiration position L4 for detection by rotation of the incubator 106. As the reaction container 121 moves to the reaction liquid aspiration position L4 for detection, the nozzle of the reaction liquid aspiration mechanism 118 for detection moves to above the reaction container 121 and moves down to aspirate the reaction liquid in the reaction container 121. This reaction liquid is sent through the liquid sending flow path 132 to the flow cell type detection unit 119 (the first detection unit 119A or second detection unit 119B) and the detection unit 119 performs detection of the object of measurement. Which one of the first detection unit 119A and the second detection unit 119B is used is determined according to the instruction for the measurement item. In some cases, an instruction on the detection unit to be used for the measurement item is not given and in such a case, the control unit 102 can select the detection unit currently on standby, as appropriate.

The control unit 102 obtains a measurement result (concentration, etc. of the object of detection in the sample) according to the detection value of the object of measurement as detected by the detection unit 119 and stores it in the storage unit 135. The measurement result can be shown on the display unit 134 such as a display. In addition, the control unit 102 moves the reaction container 121 containing the aspirated reaction liquid to the reaction container discard position L5 by rotation of the incubator 106 and moves it from the incubator 106 to above the discarding hole 110 by the conveyance mechanism 107 to discard it through the discarding hole 110.

The above detection process can be performed by the first detection unit 119A or second detection unit 119B, for example, in cycles of 24 seconds for each measurement item.

When the detection unit 119 includes a plurality of detection units (119A, 119B) as in the immuno-analyzer 101 in FIG. 1, the plurality of detection units can make measurements in parallel so that the measurement time can be shortened. For example, if the two detection units 119A and 119B make measurements in parallel, since the parallel measurement time is 12 seconds, the total required measurement time will be 36 seconds (=24+12) (shortened 12 seconds).

However, in some cases, the detection unit (119A or 119B) to be used is specified for a measurement item. For example, in an immuno-analyzer with two detection units, for a certain measurement item, the use of the first detection unit 119A for detection may be specified since only the first detection unit 119A has calibration data. Also, there is a case that the detection unit to be used is specified on a GUI for each measurement item and in that case too, only one of the detection units may be specified.

In such a case, if the same detection unit is consecutively specified by consecutive measurement numbers, only one of the detection units would be consecutively used, and the other unit would not be used and remain idle. This would cause a problem that the total analysis time is lengthened. This problem is explained below in more detail referring to FIG. 2.

Figure 2:
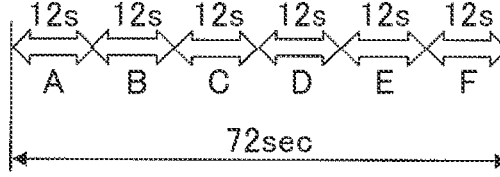
FIG. 2 is an explanatory diagram that explains the problem with the case that the same detection unit is consecutively specified by a series of measurement items.
Figure 2:
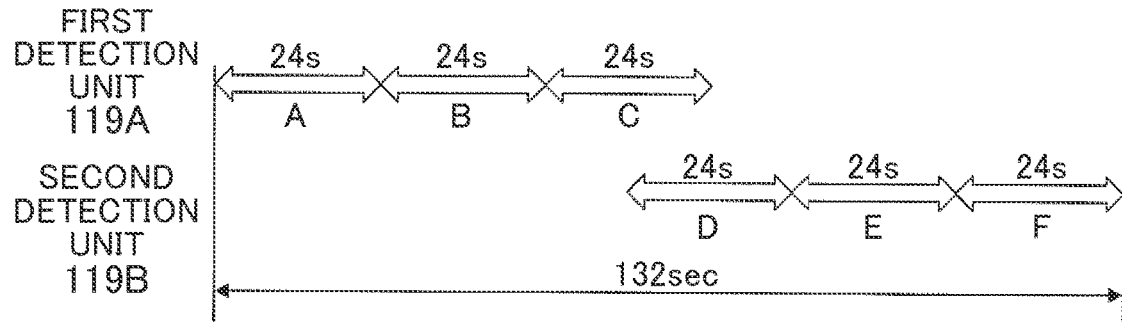

In the example of FIG. 2, as shown in the table of FIG. 2(a), a sample as the object of measurement (a or b) and measurement items (A to F) are indicated for measurement numbers 1 to 6. It is assumed here that the detection unit 1 is specified for measurement items A, B, and C and the detection unit 2 is specified for measurement items D, E, and F. It is also assumed that sample dispensing takes 12 seconds for one measurement item and takes 72 seconds for six measurement items (6×12=72). In the table of FIGS. 2, (1) and (2) represent the specified type of detection unit (the first detection unit 119A or the second detection unit 119B).

In the example of FIG. 2, measurement items A to C are indicated for measurement numbers 1 to 3 respectively and the first detection unit 119A (1) is specified for all these measurement items. Also, measurement items D to F are indicated for measurement numbers 4 to 6 respectively and the second detection unit 119B (2) is specified for all these measurement items.

If dispensing operation is performed in the order of measurement numbers (1 to 6) shown in the table of FIG. 2(a) and detection operation is performed in the order of dispensing, detection by the first detection unit 119A will be performed three times consecutively and detection by the second detection unit 119B will be performed three times consecutively. In this case, while detection by the first detection unit 119A is under way, the second detection unit 119B is idle or not operated, and conversely while detection by the second detection unit 119B is under way, the first detection unit 119A is idle or not operated. In other words, except the time to switch from measurement number 3 to measurement number 4, the first detection unit 119A and second detection unit 119B cannot be operated in parallel and the total analysis time will be long. In the example of FIG. 2, the analysis time is shortened only 12 seconds which corresponds to parallel operation time and the total analysis time for the six measurements is 132 seconds (=24×6−12). In other words, although the required dispensing time is 72 seconds, the total detection time is as long as 132 seconds because parallel measurement cannot be made.

Therefore, in the immuno-analyzer 101 according to the first embodiment, if measurement items indicating the same detection unit are specified consecutively, operation to change the order of sample dispensing is performed so that the same detection unit is not used consecutively. The operation to change the order of sample dispensing will be explained in more detail referring to FIG. 3.

Figure 3:
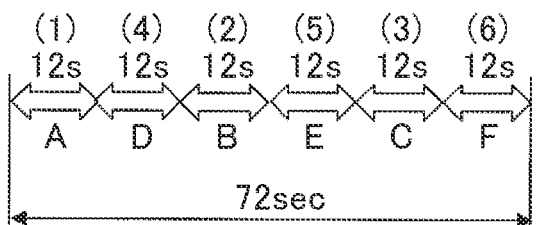
FIG. 3 is a schematic diagram that explains operation of the immuno-analyzer 101 according to the first embodiment.
Figure 3:
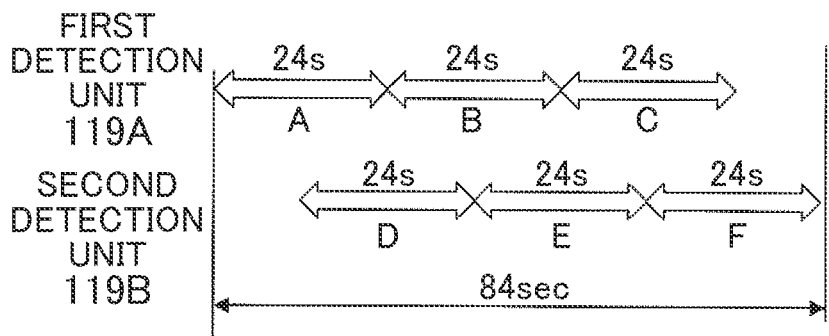

FIG. 3 is a schematic diagram that explains operation according to the first embodiment. As shown in FIG. 3(a), it is assumed that six measurement numbers are specified as in the example of FIG. 2. In the first embodiment, when the same detection unit is specified for consecutive measurement numbers, the control unit 102 performs operation to change the order of sample dispensing to prevent the same detection unit from being used consecutively.

In the example of FIG. 3(a), the first detection unit 119A is specified three times in a row by three measurement items (measurement numbers 1 to 3). The second detection unit 119B is also specified three times in a row by three measurement items (measurement numbers 4 to 6). Therefore, after dispensing operation for measurement number 1 (sample a, measurement item A) is ended, the control unit 102 checks the detection unit specified by the measurement item with the next measurement number 2. The control unit 102 decides that the same detection unit (first detection unit 119A) is specified consecutively and changes the order of dispensing. In the example of FIG. 3(a), it is measurement number 4 that specifies the second detection unit 119B, which is a detection unit different from the first detection unit 119A specified for measurement number 1. Therefore, after dispensing operation for measurement number 1 is ended, the control unit 102 skips measurement numbers 2 and 3 (hereinafter this operation is called "dispensing skip operation") and jumps to measurement number 4 to perform dispensing operation.

Similarly, after dispensing operation for measurement number 4 is ended, if the normal order is followed, dispensing operation for measurement number 5 would be performed. However, like measurement number 4, measurement number 5 relates to measurement item E which specifies the second detection unit 119B. The same is true for measurement number 6. Therefore, the control unit 102 skips measurement numbers 5 and 6 and jumps to measurement number 2 for which dispensing operation is not ended yet.

After that, similarly the control unit 102 changes the order of dispensing operation to dispense the sample so that the same detection unit is not specified for consecutive measurement numbers. In the case of measurement numbers 1 to 6 as shown in FIG. 3(a), dispensing operation is performed in the following order: measurement numbers 1, 4, 2, 5, 3, and 6, as shown in FIG. 3(b). When operation is performed in this way, it is least likely that the same detection unit is consecutively used for consecutive measurement items (measurement numbers). As the consecutive use of the same detection unit is less frequent, the first detection unit 119A and second detection unit 119B are operated in parallel more frequently and accordingly the total analysis time can be shortened. For example, if the required dispensing time is 72 seconds, the total analysis time can be shortened to 84 seconds by making measurements in parallel.

Figure 4:
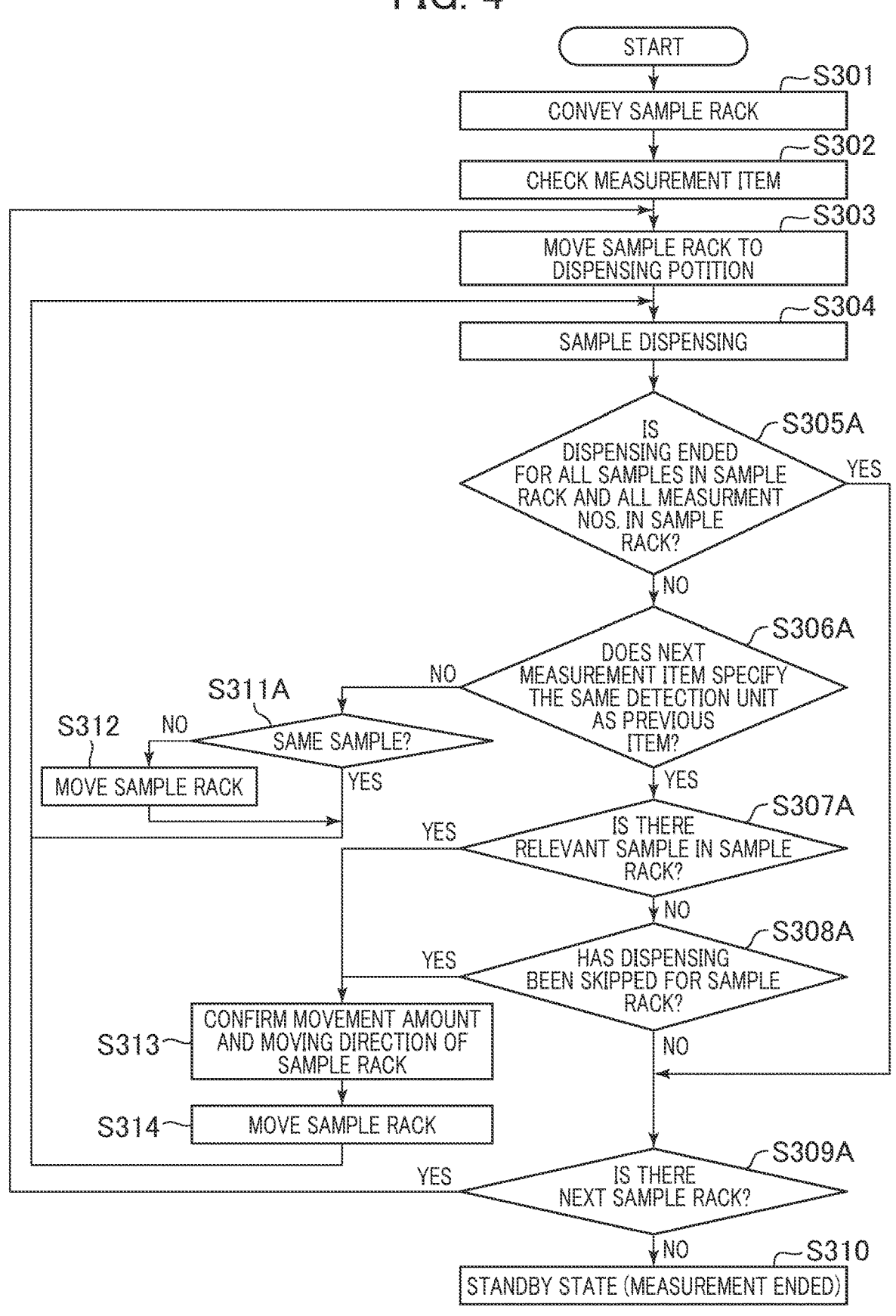
FIG. 4 is a flowchart that explains operation of the immuno-analyzer 101 according to the first embodiment.

Details of sample dispensing operation in the first embodiment will be explained referring to the flowchart of FIG. 4. Sample dispensing operation is controlled by the control unit 102.

To start sample dispensing operation, first the sample rack 103 in which a plurality of samples are loaded is conveyed to the immuno-analyzer 101 (Step S301). As the sample rack 103 is conveyed, the control unit 102 checks the measurement items for each sample according to the measurement number order (Step S302). For example, the immuno-analyzer 101 reads the barcode attached to the sample container 120 using a barcode sensor (not shown) and recognizes the measurement items for each sample and the detection unit specified by the measurement items (Step S302). The barcode and barcode sensor are merely an example of elements to check the measurement items, and any form that can provide information on measurement items and specified detection units to the control unit 102 can be adopted.

When reading of the barcode (measurement item and detection unit) is completed at Step S302, the sample rack 103 moves to the sample discharge position L3 along the rack conveyance line 104 (Step S303). After the movement is completed, the rack stands by for start of dispensing operation. A plurality of sample racks can stand by on the rack conveyance line 104. If dispensing operation for the sample rack related to the previous measurement number is not completed yet, the new sample rack 103 stands by at an escape position until dispensing operation for the previous sample rack 103 is completed and after completion of the dispensing operation, it moves to the sample discharge position.

After movement of the sample rack 103 to the sample discharge position L3 is completed, the sample dispensing mechanism 105 dispenses the sample, the amount of which depends on the measurement protocol indicated for the measurement item, into the reaction container 121 (Step S304).

After that, a decision is made as to whether or not dispensing is ended for all the samples in the sample rack 103 currently in the sample discharge position L3 and all the measurement numbers (Step S305A). If dispensing is ended for all the samples and all the measurement numbers (Yes at Step S305A), a decision is made as to whether or not the next sample rack 103 stands by on the rack conveyance line 104 (Step S309A). If the next sample rack 103 stands by on the rack conveyance line 104, the same sample dispensing operation is repeated. If there is no next sample rack 103 on the rack conveyance line 104 (No at Step S309A), the measurement process is ended or transition to the standby state takes place (Step S310). Here, "standby state" means a condition in which, when the sample rack is conveyed to the immuno-analyzer 101, dispensing of a sample can be immediately started.

On the other hand, if it is decided that dispensing for all the samples in the sample rack 103 currently in the sample discharge position L3 and all the measurement numbers is not ended (No at Step S305A), a decision is made as to whether or not the measurement item related to the next measurement number specifies the same detection unit as the measurement item related to the last (previous) measurement item (Step S306A). If the same detection unit is not specified (No), the process goes to Step S311A. On the other hand, if the same detection unit is specified (Yes), the process goes to Step S307A.

Furthermore, at Step S311A, a decision is made as to whether or not the sample for the next measurement item is the same as the sample related the previous measurement number. If the sample is the same (Yes at Step S311A), sample rack 103 is not moved and the sample is dispensed from the same sample container 120 that has been used last time. If the sample is not the same (No at Step 311A), the sample rack 103 is moved to the position of the sample for the measurement item and the same sample dispensing operation is performed.

At Step S307A, in order to prevent the same detection unit from being specified consecutively, the measurement number of the measurement item which specifies the same detection unit is skipped (dispensing skip operation) and instead, a decision is made as to whether or not there is a sample for a measurement item which specifies a different detection unit, in the sample rack 103. If there is such a sample (Yes at Step S307A), the process goes to Step S313. If there is no such a sample (No at Step S307A), the process goes to Step S308A. At Step S313, the amount of movement and moving direction of the sample rack 103 are confirmed, for example, according to output from the abovementioned barcode sensor or the like and the sample rack is moved (Step S314).

If the relevant sample is not present in the sample rack 103 currently in the sample discharge position L2 (No at Step 307A), a decision is made as to whether or not dispensing skip operation has been so far performed for the sample rack 103 concerned (Step S308A). The control unit 102 can store history data about whether or not dispensing skip operation has been performed and the decision at Step S308 is made according to the history data. If dispensing skip operation has been performed (Yes), the process goes to Step S313 and the same steps as above are carried out. On the other hand, if dispensing skip operation has not been performed (No), the process goes to Step S309A, and the same steps as above are carried out.

As explained so far, in the first embodiment, priority is given to dispensing operation to enable a plurality of detection units to be operated in parallel to make measurements and secondarily the order of measurement numbers is taken into consideration. For this reason, usually the sample rack 103 moves in the forward direction, but when it is decided that the same detection is specified consecutively, the moving direction may be changed so that the sample rack 103 moves in the reverse direction. The above sample dispensing steps are repeated until all the measurement items for the samples set in the sample rack are finished. In other words, in the first embodiment, the sample rack is moved according to the measurement items so that measurements are made by a plurality of detection units alternately whenever possible. Consequently, a plurality of detection units can make measurements in parallel and the total analysis time can be shortened.

In this embodiment, an explanation has been made of the case that the order of measurement is changed for the same sample rack 103. However, instead, the same steps may be taken across a plurality of sample racks. If that is the case, measurement information on the plurality of sample racks is checked and the order of dispensing operation is changed across the plurality of sample racks.

Second Embodiment

Figure 5:
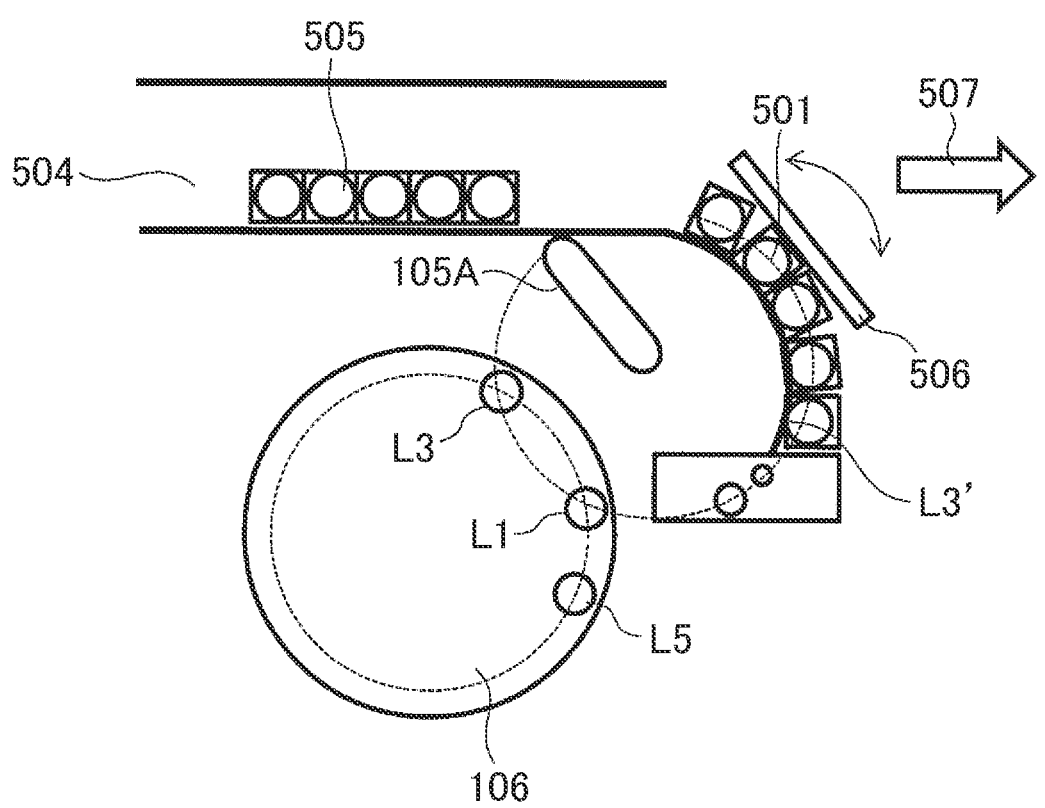
FIG. 5 is a schematic diagram that explains part of the structure of the automatic analyzer (immuno-analyzer) according to the second embodiment.

Next, the automatic analyzer according to the second embodiment will be described referring to FIG. 5 and so on. FIG. 5 is a schematic diagram that explains part of the structure of the automatic analyzer (immuno-analyzer) according to the second embodiment. In the immuno-analyzer according to the second embodiment, the elements other than those shown in FIG. 5 are the same as in the first embodiment, so their repeated description is omitted. The difference between the second embodiment and the first embodiment is that while a linear sample rack 103 is used in the first embodiment, sample racks 501 and 505 which can move circumferentially are used in the second embodiment. In FIG. 5, the sample rack 501 is a rack which is first moved to a sample dispensing position L3' and the sample rack 505 is a rack which is moved to the sample dispensing position L3' after dispensing from the sample rack 501 is ended.

As shown in FIG. 5, in the immuno-analyzer according to the second embodiment, the rack conveyance line 504 has a circumferential conveyance route and the sample racks 501 and 505 can move along the circumferential conveyance route. The sample racks 501 and 505 are constituted by a plurality of container cases which are connected. The plurality of container cases in one sample rack 501 or 505 are connected, for example, by hinge members or elastic members and the shape of one sample rack 501 or 505 can be flexibly changed according to the shape of the conveyance route.

On the other hand, the nozzle of the sample dispensing mechanism 105A is structured to be able to rotate around a rotation axis and the tip of the nozzle can move along the circumferential route of the conveyance line 504. Therefore, as the sample rack 501 or 505 is brought to the rack conveyance line 501, the sample dispensing mechanism 105A can access the desired sample position of the sample rack 501 or 505. The rack conveyance line 504 has a switching device 506 that can change the moving direction of the sample racks 501 and 505. In order to change the sample rack 501 in the sample dispensing position L3' and the sample rack 505 on standby in a backward position of the rack conveyance line 504, the switching device 506 rotates to move backward the sample rack 501 in the sample dispensing position L3'. Then, the switching device 506 is rotated toward a sample rack forward direction 507 to move the sample rack 501 toward the sample rack forward direction. Then, the switching device 506 is rotated toward the sample dispensing position L3' to move the sample rack 505 on standby on the rack conveyance line 504 to the sample dispensing position L3'.

Figure 6:
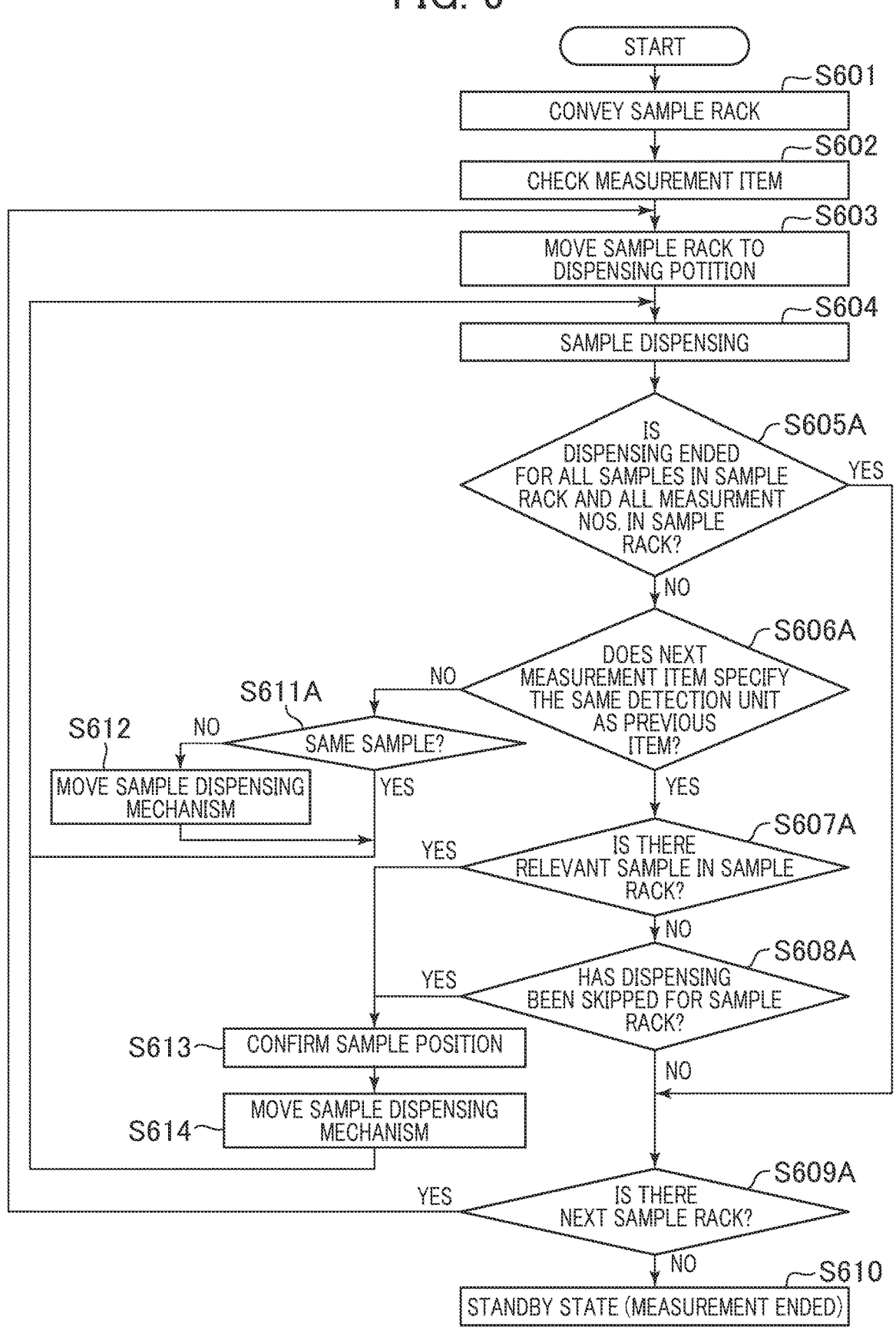
FIG. 6 is a flowchart that explains operation of the immuno-analyzer 101 according to the second embodiment.

Details of sample dispensing operation by the immuno-analyzer according to the second embodiment are explained below referring to the flowchart of FIG. 6. Sample dispensing operation is controlled by the control unit 102. In FIG. 6, Steps S602 to S610 are the same as Steps S302 to S310 in the first embodiment except the points described below and their repeated description is omitted. However, in this embodiment, if it is decided at Step S608A (equivalent to Step 308A in FIG. 4) that dispensing skip operation has not been performed, after the position of the relevant sample is confirmed (Step S613), the sample dispensing mechanism 105A moves to the confirmed sample position (Step S614). The other steps are almost the same as in the first embodiment.

As explained above, by using the sample racks 501 and 505 which can move circumferentially, the second embodiment can bring about the same advantageous effects as the first embodiment. In the second embodiment too, the order of dispensing operation can be changed across a plurality of racks as in the first embodiment.

Third Embodiment

Figure 7:
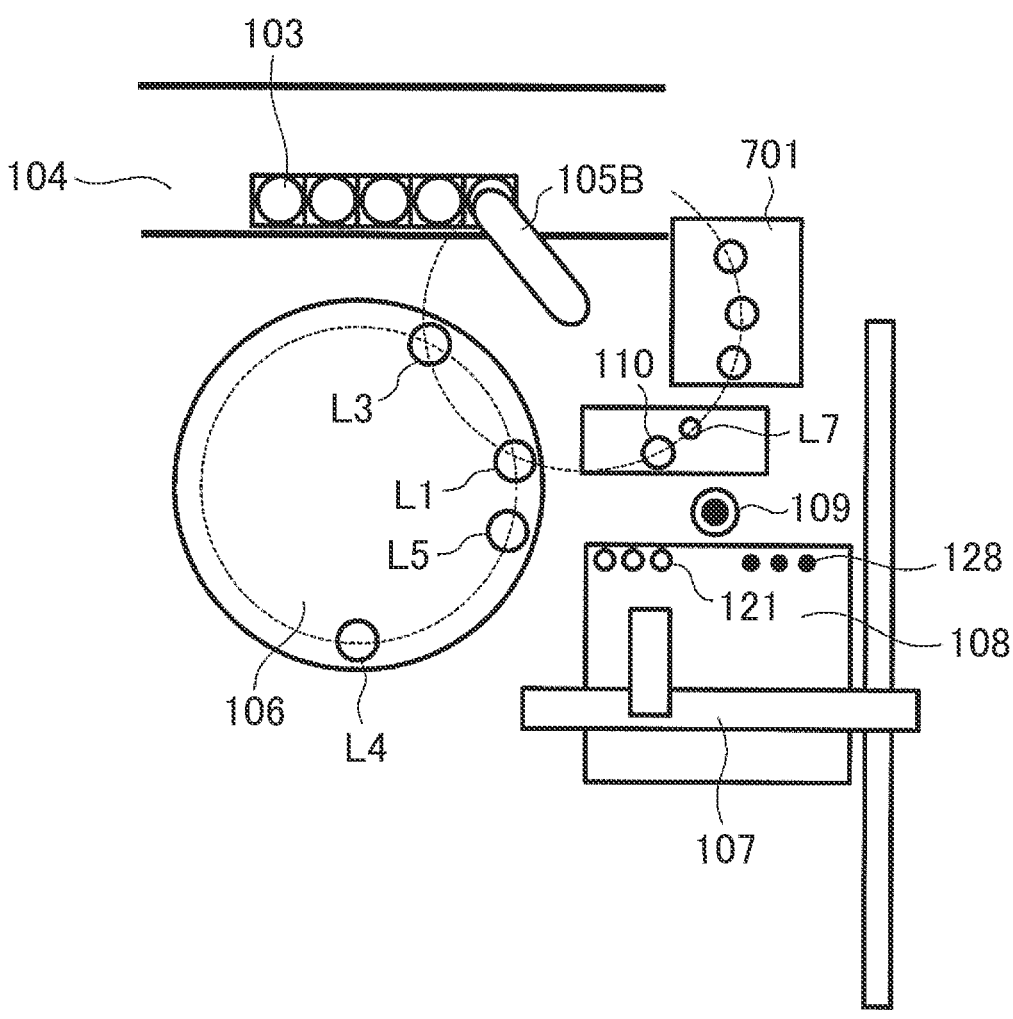
FIG. 7 is a schematic diagram that explains part of the structure of the automatic analyzer (immuno-analyzer) according to the third embodiment.

Next, the automatic analyzer according to the third embodiment will be described referring to FIG. 7 and so on. FIG. 7 is a schematic diagram that explains part of the structure of the automatic analyzer (immuno-analyzer) according to the third embodiment. In the immuno-analyzer according to the third embodiment, the elements other than those shown in FIG. 7 are the same as in the above embodiments, so their repeated description is omitted.

The difference between the third embodiment and the above embodiments is as follows. In the above embodiments, dispensing skip operation to change the order of sample dispensing is performed according to the detection units specified by measurement items. In the third embodiment too, similar operation is basically performed, but in performing dispensing skip operation, a child sample is created and the child sample is put in an area which can keep it temporarily (hereinafter called "child sample area 701"). The child sample is a sample the amount of which is required to make a measurement for a certain measurement item. A plurality of child samples can be created in the child sample area 701 and the number of child samples is not limited.

As shown in FIG. 7, in the third embodiment, the child sample area 701, which can keep child samples temporarily, is located on the circumference on which the nozzle of the sample dispensing mechanism 105B moves. When dispensing skip operation is performed, the reaction container conveyance mechanism 107 can place a reaction container 121 in the child sample area 701. In this example, the sample rack 103 and rack conveyance line 104 are the same as in the first embodiment. However, instead the same sample rack and rack conveyance line as in the second embodiment may be adopted.

Figure 8A:
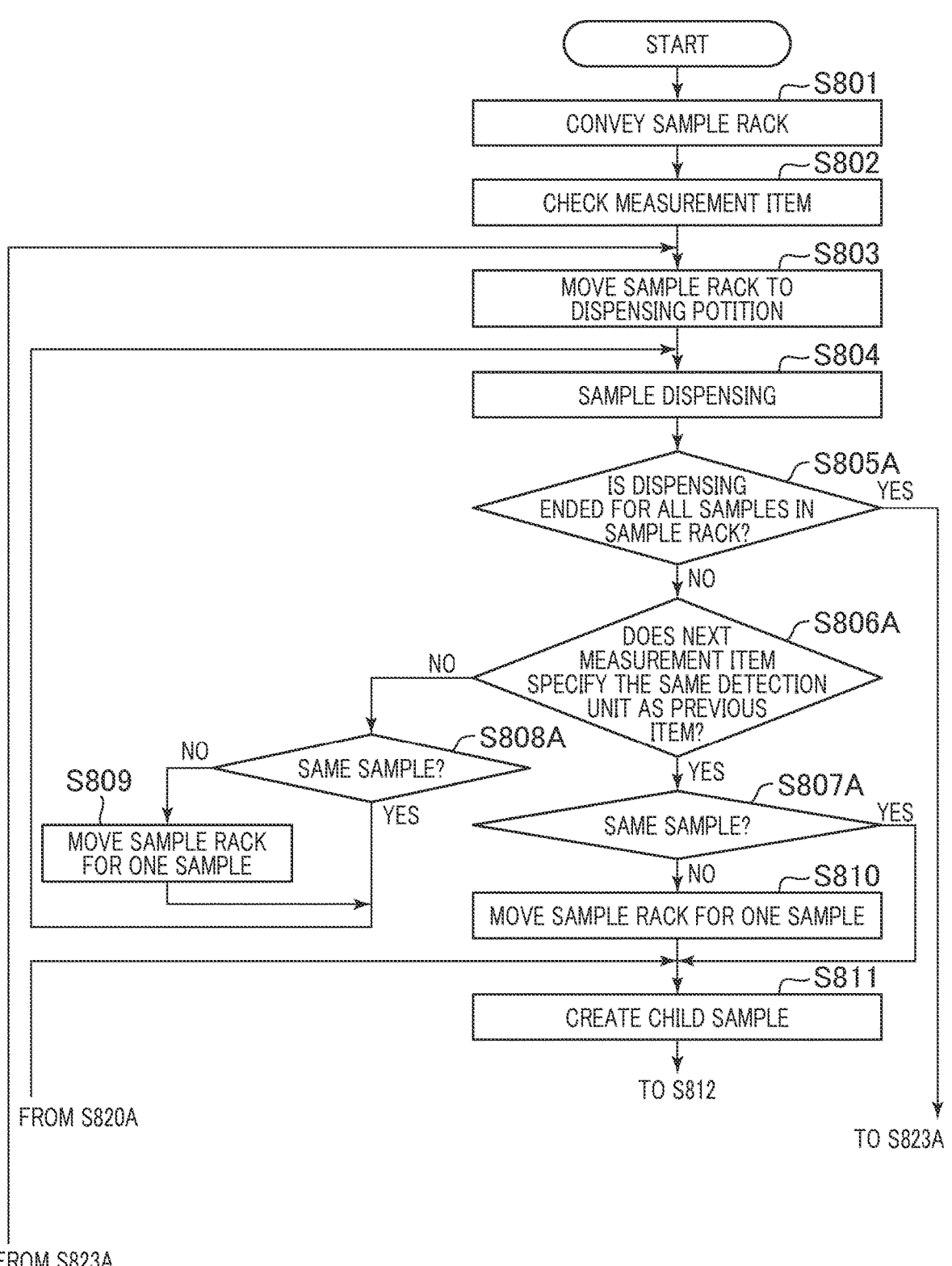
FIG. 8A is a flowchart that explains operation of the immuno-analyzer 101 according to the third embodiment.
Figure 8B:
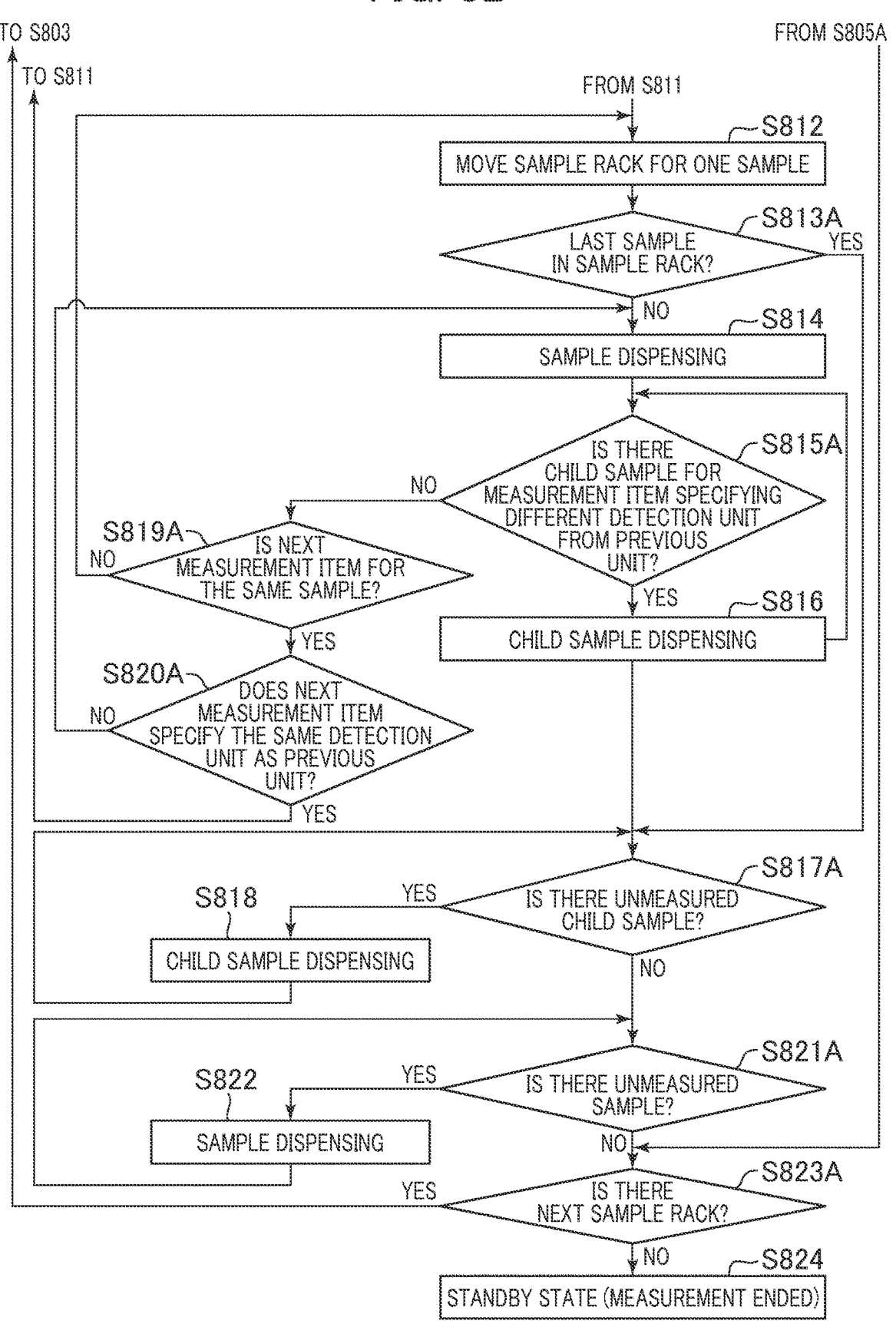
FIG. 8B is a flowchart that explains operation of the immuno-analyzer 101 according to the third embodiment.

Details of sample dispensing operation in the immuno-analyzer according to the third embodiment are explained below referring to the flowcharts of FIG. 8A and FIG. 8B. FIG. 8A and FIG. 8B show the flow of a series of sample dispensing steps. Sample dispensing operation is controlled by the control unit 102. Steps S801 to S809 in FIG. 8A area almost the same as Steps S302 to S306A, S311A and S312 in FIG. 4 in the first embodiment. Therefore, their repeated description is omitted. If different detection units are specified for consecutive measurement numbers, the process enters the loop of Steps S801 to S806A to S808A.

If it is confirmed at Step S806A that the detection unit specified by the measurement item related to the next measurement number is the same as the detection unit specified by the measurement item related to the last (previous) measurement number (Yes), the abovementioned procedure of creating a child sample is started. First, at Step S807A, a decision is made as to whether or not the sample for the next measurement number is the same as the sample for the previous measurement number.

If the decision is affirmative (Yes), the process goes to Step S811 without going to Step S810 or if the decision is negative (No), the process goes to Step S810 and then Step S811. At Step S810, the sample rack is moved a distance equivalent to one sample and then a child sample is created from a sample different from the sample for the previous measurement number (Step S811). If the sample for the next measurement number is the same as the sample for the previous measurement number (Yes at Step S807A), a child sample is created from the same sample as the sample for the previous measurement number in the child sample area 701 (Step S811).

After that, in order to dispense the sample for the next measurement number, the sample rack 103 is moved a distance equivalent to one sample (Step S812). A decision is made as to whether or not the sample after the movement is the last sample in the sample rack 103 currently in the sample dispensing position (Step S813A).

If it is not the last sample (No at Step S813A), a sample is dispensed from a sample container in the sample rack 103 which is not subjected to dispensing (Step S814) and then the process goes to Step S815A. On the other hand, if it is the last sample (Yes at Step S813A), the process goes to Step S817A.

At Step S815A, a decision is made as to whether or not there is, in the child sample area 701, a child sample for which a different detection unit from the detection unit specified by the previous measurement number is specified (Step S815A). If there is such a child sample in the child sample area 701 (Yes at Step S815A), the child sample concerned is dispensed from the child sample area 701 (Step S816). Step S815A and Step S816 are repeated until there are no such child samples in the child sample area 701.

If in the child sample area 701 there is a child sample for which a different detection unit from the detection unit specified by the previous measurement number is specified, by dispensing the child sample, two detection units can make measurements alternately (in parallel). However, if there is no such a child sample in the child sample area 701 (No at Step S815A), reference is made to the next measurement number and a decision is made as to whether or not the detection unit specified by the relevant measurement item is the same sample as the sample for the previous measurement number (Step S819A).

If it is decided that it is not the same sample (No at Step S819A), the sample rack is moved a distance equivalent to one sample (Step S812). On the other hand, if it is decided that it is the same sample (Yes at Step S819A), a decision is made as to whether or not the measurement item related to the next measurement number specifies the same detection unit as specified by the previous measurement number (Step S820A).

If it is decided that it specifies a different detection unit (No at Step S820A), sample dispensing is continued at the same position without moving the sample rack. On the other hand, if it is decided that it specifies the same detection unit (Yes at Step S820), the step to create a child sample in the child sample area 701 is carried out in the same manner as mentioned above (Step S811).

The above steps S811 to S816 are repeated until measurements for all the measurement numbers in one sample rack are completed. After that, if the sample is the last sample in the sample rack concerned (Yes at Step S813A), after dispensing all the unmeasured child samples kept in the child sample area 701 (Step S818), dispensing of the last sample in the sample rack 103 is completed (Step S822). After completion of dispensing, as mentioned above, the same sample dispensing steps are repeated for another sample rack or the measurement process is ended or the process enters the standby state (Steps S823, S824).

As explained so far, in the third embodiment, a plurality of detection units are used alternately so that the detection units can make measurements in parallel. In this case, this process can be performed easily by creating a child sample in the child sample area 701.

Fourth Embodiment

Figure 9:
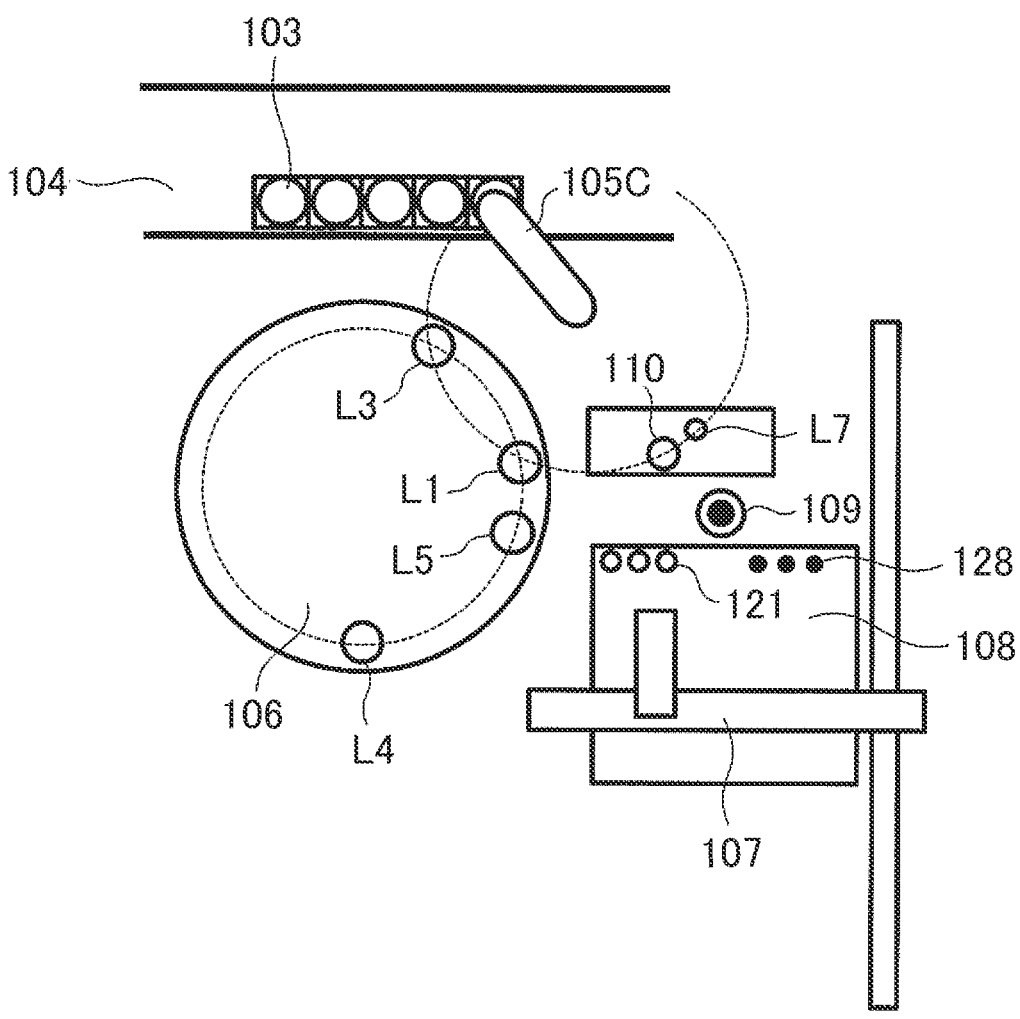
FIG. 9 is a schematic diagram that explains part of the structure of the automatic analyzer (immuno-analyzer) according to the fourth embodiment.

Next, the automatic analyzer according to the fourth embodiment will be described referring to FIG. 9. FIG. 9 is a schematic diagram that explains part of the structure of the automatic analyzer (immuno-analyzer) according to the fourth embodiment. In the immuno-analyzer according to the fourth embodiment, the elements other than those shown in FIG. 9 are the same as in the above embodiments, so their repeated description is omitted.

The difference between the fourth embodiment and the third embodiment is as follows. The third embodiment adopts a structure that when the same detection unit is specified consecutively, a child sample is temporarily kept in the child sample area 701. On the other hand, the fourth embodiment adopts a structure that when the same detection unit is specified consecutively, a child sample is temporarily kept in the incubator 106.

As shown in FIG. 9, the immuno-analyzer according to the fourth embodiment has almost the same structure as in FIG. 1 except the sample dispensing mechanism 105C. As in the above embodiments, in the fourth embodiment, when the same detection unit is specified consecutively, dispensing skip operation is performed. At that time, the reaction container conveyance mechanism 107 conveys a reaction container 121 for creation of a child sample to a prescribed position of the incubator 106. The number of reaction containers to be set is determined according to the number of times of dispensing skip operation. To set a reaction container 121 for a child sample in the incubator 106, the reaction container conveyance mechanism 107 may access the prescribed position of the incubator 106 or the incubator 106 may rotate to access the reaction container conveyance mechanism 107.

In order to shorten the time to create child samples, the sample dispensing mechanism 105C can collectively aspirate samples for a plurality of measurement numbers which are skipped by dispensing skip operation and for which child samples are to be created, from the sample rack 103. The collectively aspirated samples are separately discharged into a plurality of reaction containers 108 according to the plurality of measurement numbers.

The samples for a plurality of measurement numbers are successively discharged into a plurality of reaction containers 121, for example, by rotation of the incubator 106. For example, if three measurement items for which the amount of sample to be dispensed is 10 μL are skipped, three reaction containers 121 are set on the incubator 106. Then, the sample dispensing mechanism 105C aspirates, for example, 30 μL of sample from the sample rack 103 and discharges it into the three reaction containers 121 set on the incubator 106, on the basis of 10 μL per container.

In the above third embodiment, child samples are created in the child sample area 701 and then the samples are dispensed from the child sample area 701 to the incubator 106. On the other hand, in the fourth embodiment, since samples are dispensed into reaction containers 121 when child samples are created in the incubator 106, dispensing of child samples as performed in the third embodiment is not needed. Therefore, according to the fourth embodiment, the order of dispensing can be changed according to the contents of measurement items so that a plurality of detection units make measurements in parallel, as in the first and second embodiments.

Variations

Figure 10:
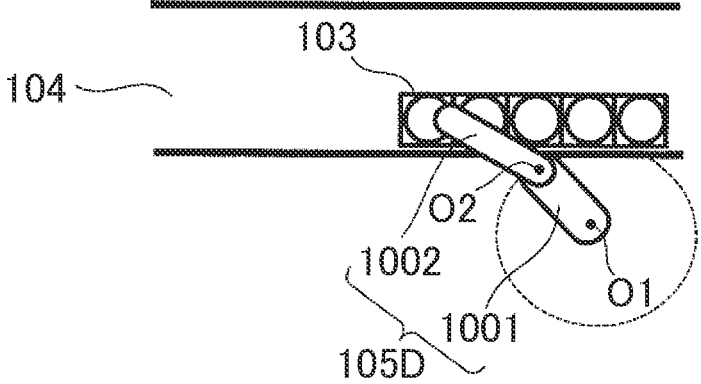
FIG. 10 is a schematic diagram that explains part of the structure of the automatic analyzer (immuno-analyzer) according to the first variation.

Next, automatic analyzers according to various embodiments will be described referring to FIG. 10 and FIG. 11. FIG. 10 is a schematic diagram that explains part of the structure of an automatic analyzer (immuno-analyzer) according to a first variation. In the first variation, the sample dispensing mechanism 105D includes a rotary shaft 1001 and a dispensing nozzle 1002. The rotary shaft 1001 can rotate around a rotation axis O1. The dispensing nozzle 1002 can rotate around a rotation axis O2 provided at the tip of the rotary shaft 1001. Thus, the sample dispensing mechanism 105D has two rotary parts and two rotation axes, unlike the sample dispensing mechanisms in the above embodiments, so it can access the desired position of the sample rack 103 and incubator 106.

Figures 11, 12:
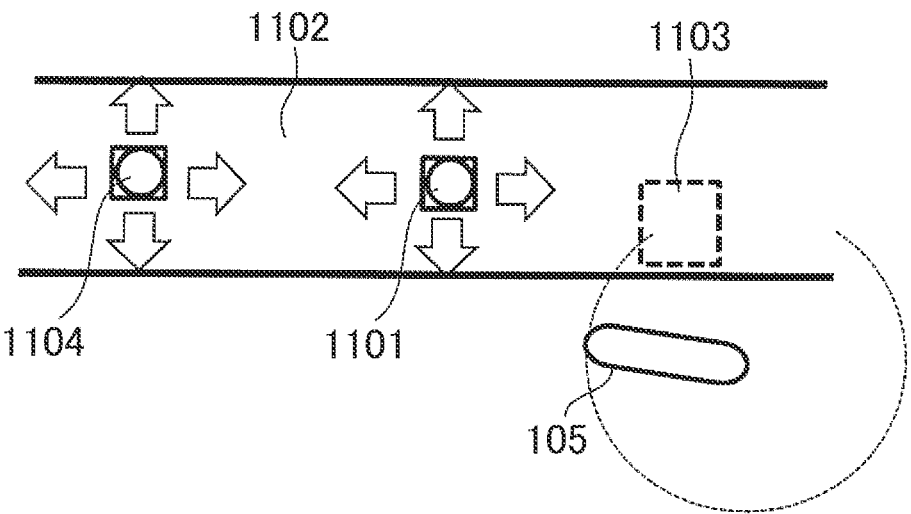
FIG. 11 is a schematic diagram that explains part of the structure of the automatic analyzer (immuno-analyzer) according to the second variation.
FIG. 12 shows an example of a screen that recommends change of the detection unit to be specified by a measurement item.

FIG. 11 is a schematic diagram that explains part of the structure of an automatic analyzer (immuno-analyzer) according to a second variation. In the above embodiments, one sample rack includes a plurality of sample containers and is conveyed by the rack conveyance line. On the other hand, in the second variation, sample containers 1101, 1104 and so on are individually conveyed along a rack conveyance line 1102. The sample containers 1101, 1104 and so on can be moved not only in the longitudinal direction but also in the transverse direction by magnetic conveyance or the like.

In the second variation, basically samples are dispensed in the order in which they have arrived at a sample dispensing position 1103 along the rack conveyance line 1102 and as in the above embodiments, when measurement numbers for measurement items that specify the same detection unit are consecutive, the order of sample dispensing can be changed as appropriate.

Next, a third variation will be explained. According to the third variation, the immuno-analyzer is connected to a sample conveyance and sample conveyance pretreatment unit in the above embodiments so that when child samples are created, the arrangement of child samples can be changed previously according to the order of measurement items. In other words, measurement items are recognized before introduction of samples into the analyzer and when child samples are created from a parent sample, the sample conveyance pretreatment unit can change the order of arrangement of child samples so that a plurality of detection units can perform detection alternately.

Next, a fourth variation will be explained. In the above embodiments, when the same detection unit is specified for consecutive measurement numbers, control is performed by changing the order of sample dispensing so that a plurality of detection units can make measurements alternately (in parallel) whenever possible. On the other hand, in the fourth variation, apart from the function to change the order of dispensing in this way, the control unit 102 has a function to record the history of dispensing skips and changes of the order of measurement and recommend change of the detection unit specified by a measurement item according to the history data. The history data on changes of the order of measurement can be stored in the storage unit 135. The decision according to the history data as to whether change of the detection unit should be recommended or not is made by the computer program that is executed by the control unit 102.

For example, in an immuno-analyzer which has made a measurement X times or more, if the number of times that the order of dispensing has been changed exceeds a threshold A, it can be presumed that the detection units specified for measurement are imbalanced. How much the number of times to change the order of dispensing can be decreased by changing the detection unit specified by a certain measurement item can be calculated according to the history data. If the calculated value is below a threshold B, a message that recommends change of the detection unit to be specified (for example, a message as shown in FIG. 12) is shown on the display unit 134. The operator can decide whether to change the detection unit to be specified for each measurement item, according to the information of the message.

The present invention is not limited to the above embodiments but includes many variations. The above embodiments have been described in detail for easy understanding of the present invention; however, the present invention is not limited to a structure which includes all the elements described above. An element of an embodiment may be replaced by an element of another embodiment or an element of an embodiment may be added to another embodiment. Also, for some elements of each embodiment, addition, deletion, or replacement of elements can be made.

LIST OF REFERENCE SIGNS

101 . . . immuno-analyzer (automatic analyzer),
102 . . . control unit,
103, 505 . . . sample rack
104, 504 . . . rack conveyance line,
105, 105A, 105B to 105D . . . sample dispensing mechanism,
106 . . . incubator,
107 . . . reaction container conveyance mechanism,
108 . . . reaction container holding unit,
109 . . . reaction container stirring mechanism,
110 . . . discarding hole,
111 . . . reagent disk,
112 . . . reagent dispensing mechanism,
113 . . . B/F separation conveyance mechanism,
114 . . . B/F separation mechanism,
115 . . . reaction liquid aspiration mechanism for B/F separation,
116 . . . buffer solution discharge mechanism,
117 . . . post-B/F-separation stirring mechanism,
118 . . . reaction liquid aspiration mechanism for detection,
119, 119A, 119B . . . detection unit (analysis unit),
120 . . . sample container,
121 . . . reaction container,
L1 . . . reaction container set position,
L2 . . . reagent discharge position,
L3 . . . sample discharge position,
L4 . . . reaction liquid aspiration position for detection,
L5 . . . reaction container discard position,
L6 . . . B/F separation conveyance position,
L7 . . . tip attachment position,
128 . . . sample dispensing tip,
130 . . . reagent disk cover,
131 . . . opening,
132 . . . liquid sending flow path,
133 . . . operation unit,
134 . . . display unit,
135 . . . storage unit,
501, 505 . . . sample rack,
506 . . . switching device,
507 . . . sample rack forward direction,
701 . . . child sample area

The invention claimed is:

1. An automatic analyzer comprising:
a sample rack configured to receive a sample;
a sample dispensing mechanism configured to aspirate the sample from the sample rack and dispense the sample into a reaction container;
a plurality of detection units configured to detect a reaction liquid received from the reaction container; and
a control unit configured to control the sample dispensing mechanism, wherein:
the control unit is configured to receive information on a measurement item specified for the sample,
the control unit is configured to control the plurality of detection units, each of which are configured to detect the reaction liquid received from the reaction container,
based on the measurement item specified for the sample specifying a first detection unit of the plurality of detection units, the control unit is configured to receive information on the first detection unit the detection units that is specified by the measurement item,
based at least on determining that measurement items received consecutively specify the same first detection unit among the plurality of detection units, the control unit is configured to change an order of dispensing by the sample dispensing mechanism so that measurements specifying different detection units are made consecutively, and based at least on determining that measurement items specifying the same first detection unit are specified consecutively, the control unit is configured to switch a moving direction of the sample rack to change an order of measurements for samples on a same sample rack.

2. The automatic analyzer according to claim 1, further comprising a linear rack conveyance line configured to move the sample rack linearly.

3. The automatic analyzer according to claim 1, further comprising a circumferential rack conveyance line configured to move the sample rack circumferentially, and wherein the sample dispensing mechanism has a nozzle whose tip is configured to rotate around a rotation axis for enabling movement of the tip along the circumferential rack conveyance line.

4. The automatic analyzer according to claim 1, further comprising:

a child sample area that can temporarily keep a child sample of the sample, wherein the control unit is further configured to:

based on determining that measurement items specifying the same first detection unit among the detection units are specified consecutively, perform an operation to set the reaction container in the child sample area, dispense the child sample into the reaction container using the sample dispensing mechanism, and temporarily keep the child sample in the child sample area, in order to change an order of dispensing by the sample dispensing mechanism so that measurements specifying different detection units are made consecutively.

5. The automatic analyzer according to claim 1, further comprising:

an incubator that accelerates reaction in the reaction container, wherein the control unit is further configured to:

based on determining that measurement items specifying the same first detection unit among the detection units are specified consecutively, perform an operation to set the reaction container in the incubator, dispense a child sample into the reaction container using the sample dispensing mechanism, and temporarily keep the child sample in the incubator, in order to change an order of dispensing by the sample dispensing mechanism so that measurements specifying different detection units are made consecutively.

6. The automatic analyzer according to claim 1, wherein the control unit is further configured to:

based on determining that a number of times to change the order of dispensing can be decreased by changing the detection unit specified by the measurement item, the control unit causes a display unit to present information related to decreasing the changing of the order of dispensing.

7. A non-transitory computer-readable storage medium storing a control program for an automatic analyzer that is executable by a control unit of the automatic analyzer for controlling sample dispensing in the automatic analyzer, wherein the automatic analyzer includes:

a sample rack configured to receive a sample;

a sample dispensing mechanism configured to aspirate the sample from the sample rack and dispense the sample into a reaction container; and a plurality of detection units configured to detect a reaction liquid received from the reaction container, the control program, executed by the control unit of the automatic analyzer, configuring control unit to:

receive information on a measurement item specified for the sample, control the plurality of detection units, each of which are configured to detect the reaction liquid received from the reaction container, based on the measurement item specified for the sample specifying a first detection unit of the plurality of detection units, the control unit is configured to receive information on the first detection unit the detection units that is specified by the measurement item, based at least on determining that measurement items received consecutively specify the same first detection unit among the plurality of detection units change an order of dispensing by the sample dispensing mechanism so that measurements specifying different detection units are made consecutively, and based at least on determining that measurement items specifying the same detection unit are specified consecutively, switch a moving direction of the sample rack to change an order of measurements for samples on a same sample rack.

8. The non-transitory computer-readable storage medium according to claim 7, wherein the automatic analyzer includes a child sample area configured to temporarily keep a child sample of the sample, wherein execution of the control program further causes the control unit to:

based on determining that measurement items specifying the same first detection unit among the detection units are specified consecutively, perform an operation to set the reaction container in the child sample area, dispense the child sample into the reaction container using the sample dispensing mechanism, and temporarily keep the child sample in the child sample area, in order to change an order of dispensing by the sample dispensing mechanism so that measurements specifying different detection units are made consecutively.

9. The non-transitory computer-readable storage medium according to claim 7, wherein the automatic analyzer includes an incubator that accelerates reaction in the reaction container, wherein execution of the control program further causes the control unit to:

based on determining that measurement items specifying the same first detection unit among the detection units are specified consecutively, perform an operation to set the reaction container in the incubator, dispense a child sample into the reaction container using the sample dispensing mechanism, and temporarily keep the child sample in the incubator, in order to change an order of dispensing by the sample dispensing mechanism so that measurements specifying different detection units are made consecutively.

10. The non-transitory computer-readable storage medium according to claim 7, wherein execution of the control program further causes the control unit to:

based on determining that a number of times to change the order of dispensing can be decreased by changing the detection unit specified by the measurement item, the control unit causes a display unit to present information related to decreasing the changing of the order of dispensing.

* * * * *